(12) United States Patent
Lotze

(10) Patent No.: US 7,246,448 B2
(45) Date of Patent: Jul. 24, 2007

(54) METHOD FOR CALIBRATING A PROBE

(75) Inventor: Werner Lotze, Dresden (DE)

(73) Assignee: Carl Zeiss Industrielle Messtechnik GmbH, Oberkochen (DE)

( * ) Notice: Subject to any disclaimer, the term of this patent is extended or adjusted under 35 U.S.C. 154(b) by 0 days.

(21) Appl. No.: 11/286,407

(22) Filed: Nov. 25, 2005

(65) Prior Publication Data
US 2006/0117587 A1   Jun. 8, 2006

Related U.S. Application Data

(63) Continuation of application No. PCT/EP2004/004805, filed on May 6, 2004.

(30) Foreign Application Priority Data

May 28, 2003 (DE) ............................... 103 24 695
Jun. 18, 2003 (DE) ............................... 103 27 867

(51) Int. Cl.
*G01B 5/012* (2006.01)
(52) U.S. Cl. .................................................. 33/559
(58) Field of Classification Search .................... None
See application file for complete search history.

(56) References Cited

U.S. PATENT DOCUMENTS 4,972,594 A * 11/1990 Gurny et al. ............... 33/558
5,895,444 A * 4/1999 Ruck et al. ................. 33/559
6,434,846 B1    8/2002 McMurtry et al.
6,580,964 B2    6/2003 Sutherland et al.

FOREIGN PATENT DOCUMENTS

JP            57127805            8/1982

OTHER PUBLICATIONS

W. Lotze "Multdimensional measuring probe head improves accuracy and functionality of coordinate measuring machines", Measurement 13 (1994), pp. 91 to 97.

* cited by examiner

*Primary Examiner*—Christopher W. Fulton
(74) *Attorney, Agent, or Firm*—Walter Ottesen

(57) ABSTRACT

A method measures values on a workpiece (7) using a coordinate measuring apparatus which has a measuring probe head (5) with a deflectable probe pin (6). The coordinate measuring apparatus can carry out a linear or non-linear projection (transformation) of the deflection signals (s) determined by the measuring probe head (5) into a coordinate system ($X_M$, $Y_M$, $Z_M$) of the coordinate measuring apparatus using parameters (A). In order to be able to use the method for any measuring probe, more particularly probes whose probe pins are not moveably guided in the directions of the coordinates, at least a portion of the parameters ($A_{anti}$) describes components of the deflection of the probe pin which are located tangentially relative to the surface of the workpiece on the touch point.

21 Claims, 5 Drawing Sheets

METHOD FOR CALIBRATING A PROBE

RELATED APPLICATIONS

This application is a continuation application of international patent application PCT/EP 2004/004805, filed May 6, 2004, and claiming priority from German patent application nos. 103 24 695.9, filed May 28, 2003, and 103 27 867.2, filed Jun. 18, 2003, the entire contents of which are incorporated herein by reference.

FIELD OF THE INVENTION

The invention relates to a method for measuring measurement values on a workpiece with a coordinate measuring apparatus which includes a measuring probe head having a deflectable probe pin. The invention also relates to a coordinate measuring apparatus with which this method can be carried out and a computer program product assigned thereto.

BACKGROUND OF THE INVENTION

Methods of this kind are already known from the state of the art. In such methods, probe heads are usually used in which the probe pin is moveably attached to the probe head in the three coordinate directions. For this purpose, the known probe heads include a probe head mechanical system in the interior thereof via which the probe pin can be deflected in the three coordinate directions. The probe head mechanical system usually has three guideways for this purpose. Each of the guideways permits the movement in one of three coordinate directions of the coordinate measuring apparatus. For this purpose, each of the three guideways is aligned parallelly to one of the movement directions of the coordinate measuring apparatus.

The deflections of the probe pin are measured by the measuring systems of the probe head. In order to incorporate these measured deflections of the probe pin into the coordinate system of the coordinate measuring apparatus, a transformation matrix was used in the past via which the measured measurement values of the probe pin deflection (deflection signals or probe head signals) were transformed into a coordinate system of the coordinate measuring apparatus. The individual parameters of this matrix were determined in preceding calibration operations.

A corresponding probe head, for which such a calibration operation was explained, is described in the article entitled "Multidimensional measuring probe head improves accuracy and functionality of coordinate measuring machines" by W. Lotze published in the journal "Measurement 13" on pages 91 to 97 (1994) (publisher: Elsevier Science B.V.). On pages 95 and 96 of this publication, a description is provided for the determination of the parameters of a corresponding matrix H for the two-dimensional case (the probe can only be moved in the xy-plane).

In recent times, and for various reasons, probe heads were used whose guideways no longer permit movement parallel to the coordinate directions of the coordinate axes of the coordinate measuring apparatus. For example, probes are used whose probe pin is linearly guided in the direction of its longitudinal axis; whereas, the probe pin is rotatably moveably journalled via a cardan joint for movement in the two other coordinate directions.

In the attempt to couple such a probe head to a coordinate measuring apparatus utilizing conventional transformation matrices, problems have developed insofar as the known methods for calibrating corresponding probe heads no longer converge.

SUMMARY OF THE INVENTION

For the reasons advanced above, an object of the invention is to provide a measuring method with which any number of measuring probe heads can be coupled to a coordinate measuring apparatus especially including those probe heads whose guides are not aligned parallel to the coordinate axes of the coordinate measuring apparatus and whose elastic characteristics are different.

Another object of the invention is to provide a coordinate measuring apparatus with which the above method can be carried out as well as a corresponding computer program product.

The method of the invention is for measuring measurement values on a workpiece with a coordinate measuring apparatus including a measuring probe head having a deflectable probe pin. The method includes the steps of: obtaining deflection signals (s) from the measuring probe head; providing parameters (A) of which at least a portion ($A_{anti}$) thereof describes components of the probe pin deflection which are tangential to the surface of the workpiece at a touch point; and, causing the coordinate measuring apparatus to carry out a linear or nonlinear projection of the deflection signals (s) into a coordinate system ($X_M, Y_M, Z_M$) of the coordinate measuring apparatus.

What is special about the above method is that according to the invention, specifically components are considered in the formation of the deflection signals which are at the contact or touching point tangential to the surface of the workpiece during the measurement as well as during the calibration.

In the coordinate system of the coordinate measuring apparatus, it is preferably the central machine coordinate system with respect to which all measurements take place. The coordinate measuring system can be any other coordinate measuring system which can be transformed into the machine coordinate system.

Even though the method of the invention is especially for probe heads, which have no guideways that are aligned parallelly to the coordinate directions of the coordinate measuring apparatus, the method can be used also for any conventional probe heads wherein the guideways are aligned, for example, parallel to the coordinate directions.

In lieu of the term "transformation" of the deflection signals, the more general term "linear or nonlinear projection" is used because the term "transformation" describes only specifically the projection of vectors in Euclidian space onto vectors in the Euclidian space. Euclidian space is the known three-dimensional space whose vectors can be described via the coordinates x, y and z in a Cartesian coordinate system. Such a projection is given when the deflection of the probe pin was measured in the three coordinate directions. For the case of a probe, however, wherein the deflection in a coordinate direction is measured, for example, as a rotation of the probe pin, the deflection signals do not form vectors in Euclidian space.

Even though the parameters, which describe the tangential components of the probe pin deflection, can be basically present in different form, for example, as parameters of equations, these parameters advantageously form a matrix, especially a rotation matrix.

In order to be able to determine the parameters, which describe the tangential components of the probe pin deflection, at least one of the two following named target functions $Q_2$ or $Q_3$ should be satisfied in the calibration at the calibration normal:

target function $Q_2 = \Sigma v_i \times n_i \Rightarrow 0$; or, target function $Q_3 = \Sigma (v_i \times n_i)^2 \Rightarrow \min$ wherein:

$v_i$=deflection vector of the probe ball in the i-th measurement point;

$n_i$=normal vector at the contact or touching point of the probe ball on the surface of the workpiece (of the calibration normal) during measurement at the i-th measurement point.

The measuring points $v_i$, which are used for solving the target functions $Q_2$ or $Q_3$, should be recorded by scanning at least a half circle on a calibration body. The scanning of a single half circle is, however, only sufficient for the case wherein the probe can be deflected in two coordinate directions. In this case, the half circle can, for example, be scanned on a ring gauge or on a calibration ball.

For the case wherein the probe pin can be deflected in all three coordinate directions, measurement values should be taken up as evenly distributed as possible over a hemisphere. This can, for example, be realized in that at least three different half circles are measured on a calibration ball which lie on a hemisphere. With respect to half circles, what is intended here is three large circles of the calibration ball, that is, circles having the diameter of the calibration ball.

The scanned measurement points should be so recorded that they are uniformly distributed over the scanned half circle or hemisphere.

For the linear or nonlinear formation of the probe head signals, additional parameters can be used which describe components of the probe pin deflection which are normal to the surface of the workpiece at the touching point.

These parameters can likewise form a matrix. These parameters are determined during calibration in a manner known per se with the equalization condition from the following target function:

target function $$Q_1 = \sum f_{n,i}^2 \Rightarrow \text{Min}$$

wherein $f_{n,i}$ characterizes the normal deviations, that is, the deviations in the direction normal to the surface of the workpiece at the contact point, for example, of the calibration sphere.

The method can be realized as a computer program product which can be loaded directly into the internal memory of a digital control and evaluation unit of a coordinate measuring apparatus and which includes software segments which can execute the method. The computer program product can be stored on a data carrier such as a CD-Rom, DVD-Rom, diskette, hard drive or a USB storage pin, et cetera.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
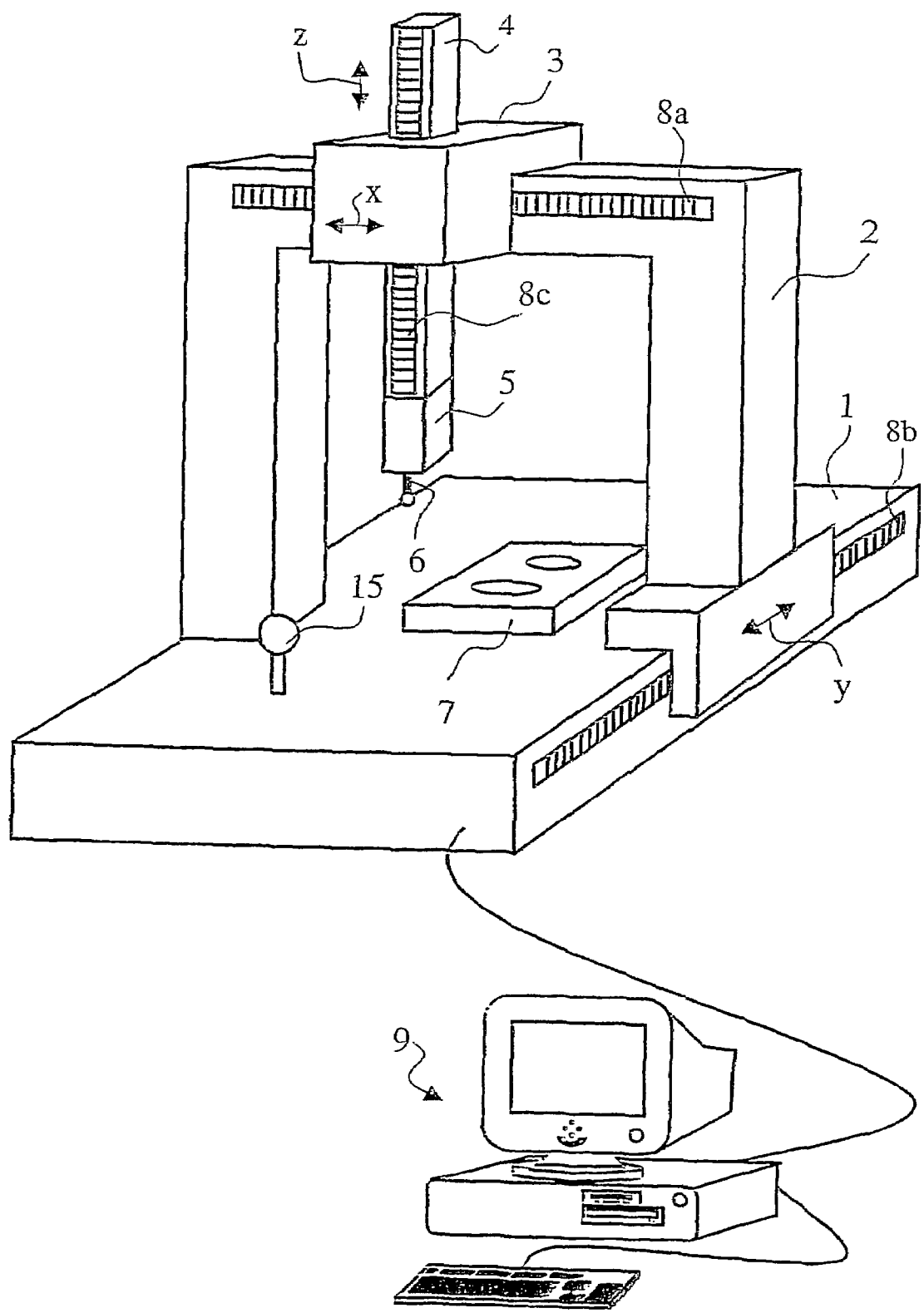
FIG. 1 is a perspective view of a coordinate measuring apparatus for carrying out the method of the invention.

FIG. 1 shows a coordinate measuring apparatus of the invention on which the method of the invention is carried out. The coordinate measuring apparatus includes a measuring table 1 on which a workpiece 7, which is to be measured, is supported. A portal 2 can be moved along the measuring table 1 utilizing motors in the direction identified by the arrow Y. The precise position of the portal 2 can be scanned on a scale 8b. Along the traverse of the portal 2, an X-carriage 3 is supported so as to be motorically displaceable in the direction given by the arrow X. The position of the X-carriage 3 can be determined from scanning the scale 8a. The X-carriage 3 moveably supports a spindle 4 in the direction identified by the arrow Z and the spindle 4 can also be motorically displaced. The precise position of the spindle 4 can be determined by scanning the scale 8c. At the lower end of the spindle 4, a so-called measuring probe head 5 is attached whereat a probe pin 6 is attached. The probe pin 6 is moveably supported in the three coordinate directions (x, y, z).

A control and evaluation unit 9 is provided for controlling the coordinate measuring apparatus and for evaluating the measuring data recorded thereby. The control and evaluation unit 9 is embodied by a personal computer in the specific coordinate measuring apparatus shown.

The coordinate measuring apparatus shown in FIG. 1 is only one of many different possibilities. For example, the mechanics for moving the probe head 5 can be configured completely differently. In lieu of the portal configuration shown here by way of example, a stand configuration can, for example, be used wherein a horizontally projecting measuring arm is moveably guided on a vertically aligned stand. Furthermore, and in lieu of the probe head 5, also the workpiece 7 can be moved in one or several coordinate directions in that the measuring table 1 is moved in the corresponding directions. Likewise, rotational joints can also be provided in lieu of the linear moveable measuring carriages (2, 3, 4). The control and evaluation system can also be differently configured and, for example, can be configured as two parts, namely, a measuring computer and a separate control cabinet.

Figure 2A:
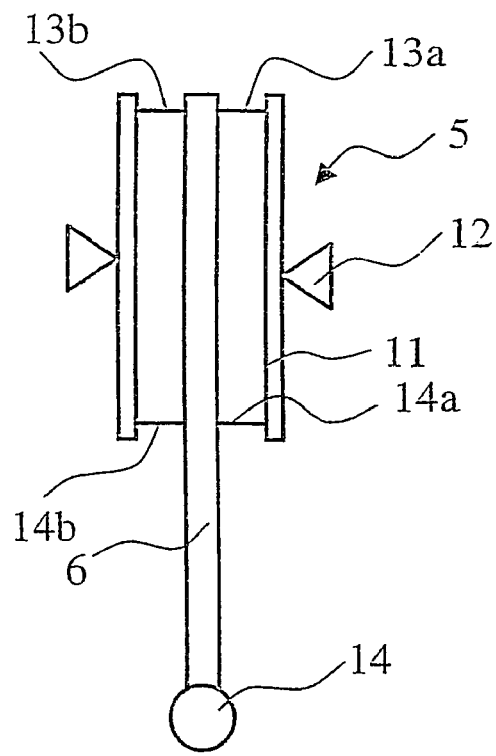
FIGS. 2a to 2c are respective schematic representations of a probe head mechanical system wherein the probe pin is guided in a coordinate direction (z) via a linear guideway and is guided rotatably-moveably in the two other coordinate directions via a cardan joint.
Figure 2B:
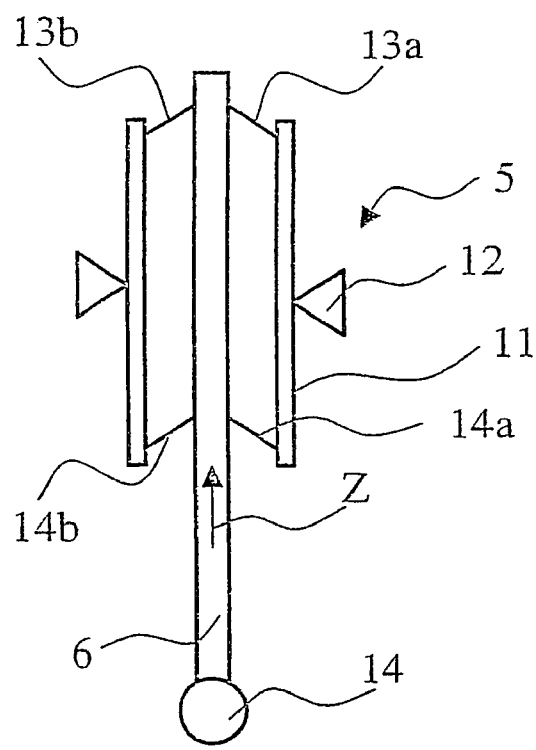
Figure 2C:
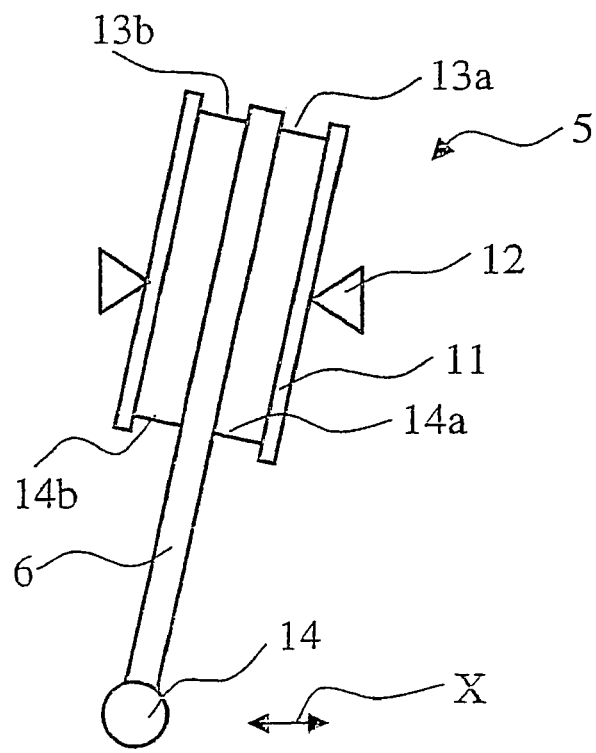

The measuring probe head, which is identified in FIG. 1 by reference numeral 5 and is shown purely by way of example and very schematically, is shown in FIGS. 2a to 2c. As shown here, the probe pin 6 is linearly guided in a hollow cylinder 11 via leaf springs (13a, 13b, 13c) and (14a, 14b, 14c) in the direction identified by the arrow Z as shown in FIG. 2b. The leaf springs (13a, 13b, 13c) and (14a, 14b, 14c) are mounted offset to each other at an angle of 120° so that the leaf springs (13c and 14c) cannot be seen. The hollow cylinder 11 is, in turn, attached rotatably moveably on the probe head housing of the probe head 5 via a schematically shown cardan joint 12. The cardan joint can, for example, be configured as a round leaf spring membrane which, via corresponding cutouts, makes possible the rotational movability. A movement in the coordinate direction identified by arrow X is shown in FIG. 2c. The movement of the probe pin in the third coordinate direction (direction Y) takes place perpendicular to the leaf spring plane and is completely analog to FIG. 2c.

It is understood that the configuration of the measuring probe head 5 shown here is only purely by way of example. For example, the mechanical system for movingly supporting the probe pin 6 can also have three sequentially arranged spring parallelograms which linearly guide the probe pin 6 in the three coordinate directions.

Figure 3:
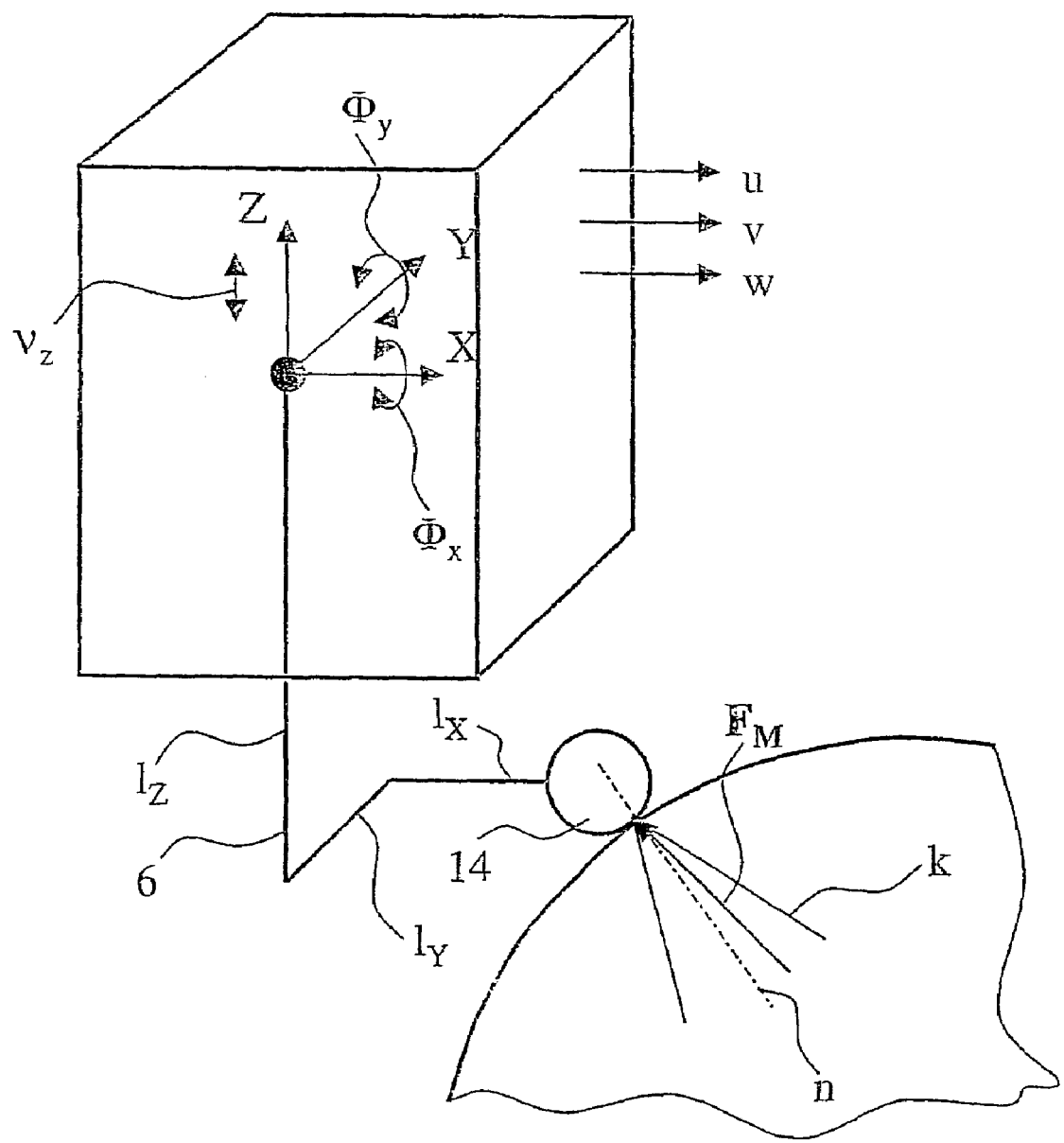
FIG. 3 is a schematic of different quantities of the probe head together with the kinematics of the probe head according to FIGS. 2a to 2c.

FIG. 3 is a schematic of the relationships of the probe head 5 in accordance with FIGS. 2a to 2c with a probe pin 6 generalized with respect to geometry. The probe pin 6 need not, of course, be aligned exclusively in the direction indicated by arrow Z as shown in FIGS. 1 and 2a to 2c; instead, the probe pin can also assume another geometry, for example, be configured as a star probe. The reach of the probe pin is here identified by $(l_x, l_y, l_z)$. The linear elastic yieldability of the probe pin 6 because of the leaf springs (13a to 13c and 14a to 14c) in the coordinate direction (indicated by arrow Z) is herein identified by $v_z$. A deflection of the probe pin 6 relative to the probe head 5 in the coordinate direction Y, in contrast results in a rotation about the axis identified by X. The elastic rotation yielding resulting by the corresponding leaf spring membrane 12 is identified by $\Phi_x$. A deflection of the probe pin 6 in the coordinate direction X results in a rotation about the axis Y. The elastic rotation yielding, which results with respect thereto via the leaf spring membrane 12, is identified by $\Phi_y$. The corresponding electrical signals, which are recorded by the sensors (not shown), are detected, for example, by inductively operating sensors such as, for example, LVDTs (Linear Variable Differential Transformers) or by incremental scales or by interferometers. The corresponding signals are identified by reference characters (u, v, w). The electric transfer factors of the sensors are, for the present case of linear sensor characteristic lines, identified by $(k_x, k_y, k_z)$ It is expressly noted here that a model is used in the embodiment shown here wherein the deflecting signals (s={u,v,w}) were generated by the sensors in the probe head based on sensor characteristic lines. The sensor characteristic lines can either already be physically linear or can be linearized by corrective values which are recorded in a preceding calibrating operation.

It is understood that the invention is, however, not limited to linear sensor characteristic lines. Alternatively, the mathematical models can be varied so that also nonlinear sensor characteristic lines can be processed.

The measuring force, which is applied by the probe ball 14 on the workpiece 7, is identified by $F_M$. The measuring force can likewise be applied differently, for example, by springs which are tensioned with the deflection of the probe pin out of its rest position or by inductively operating plunge coil drives which generate a force in the corresponding coordinate direction. The surface normal at the measurement point is identified by n, that is, the normal direction to the surface of the workpiece at that point at which the probe ball 14 touches the surface of the workpiece 7. Reference character k identifies the so-called friction cone. The friction cone characterizes all possible directions of the measuring force $F_M$ which can result during touching because of the friction force between the probe ball 14 and the surface of the workpiece. If the friction between the probe ball 14 and the workpiece 7 was zero, then the measuring force $F_M$ would have to be aligned precisely along the surface normal n. However, this cannot be the case because of the actual existing friction force. For this reason, the measuring force $F_M$ varies about the surface normal n in the region of the friction cone k.

Figure 4:
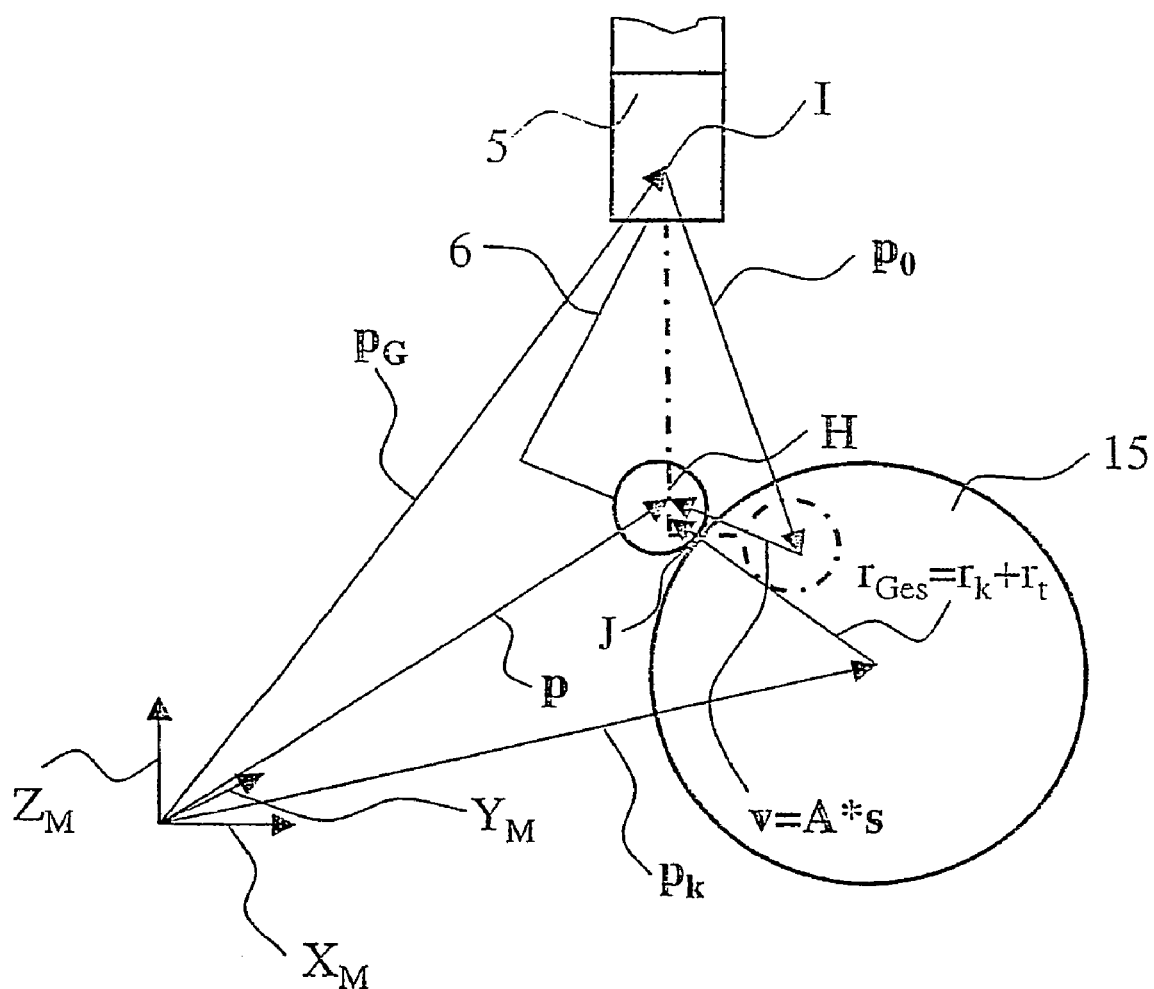
FIG. 4 is a schematic representation of the vector relationships in the scanning of a calibration ball; and, FIG. 5 is a schematic showing the angle ($\epsilon$) conjointly defined by the measuring force ($F_M$) and the probe deflection (v).

For a probe head of this kind, and as shown in FIG. 4, the following matrix equation applies in a coordinate measuring apparatus of FIG. 1:

$$p = p_G + A \cdot s + p_0 = p_G + v + p_0 \qquad (1)$$

The characters used in the above equation (1) have the following meaning:

p  actual coordinates $\{X_H, Y_H, Z_H\}$ of a measurement point H measured in the machine coordinate system $(X_M, Y_M, Z_M)$ of the coordinate measuring apparatus;

$p_G$  measurement coordinates $\{X_G, Y_G, Z_G\}$, which are determined by the coordinate measuring apparatus by reading off the scales (8a to 8c), up to a predefined point I in the region of the probe head 5;

$p_0$  offset vector from the predefined point I in the region of the probe head 5 to the center point of the probe ball 14 in its rest position;

v  deflection vector of the probe ball 14 from its rest position;

A  probe matrix; and, s  signal vector {u, v, w} of the sensors in probe pin 5 which measure the probe pin deflection of the probe pin 6.

As shown in FIG. 4, the calibration sphere 15 is contacted by the probe ball 14 in the embodiment shown here. The broken line shows the position of the probe pin 6 and the probe ball 14, which is attached to the probe pin, in the rest position; whereas, the solid line representation shows the probe pin 6, which is deflected because of the contact, and the probe ball 14 attached thereto. The actual coordinates $(X_H, Y_H, Z_H)$ of the vector p to the measurement point H determined in the central machine coordinate system $(X_M, Y_M, Z_M)$ of the coordinate measuring apparatus result, as also shown in equation (1), from the sum of the vector $p_G$, the vector $p_0$ and the vector v which results from the product of the signal vector s and the probe matrix A.

It is here noted that the vector p, which identifies the measurement point H, points in the direction of the center point of the probe ball 14. The actual vector $p_J$ (not shown in FIG. 4) to point J whereat the probe ball 14 touches the workpiece 7 in a later measuring sequence, that is, the calibration ball 15 is touched in the calibration operation, must take place via additional addition of a vector (not shown) which results from the multiplication of the probe ball radius $r_1$ and the normal vector n (the normal direction in the surface of the workpiece which results at the contact point between probe ball 14 and workpiece 7) as shown by the following equation (2):

$$p_J = p + r_1 \ast n \qquad (2)$$

The probe matrix A is required, for example, for the probe head 5 shown in FIGS. 2a to 2c and FIG. 3. This probe matrix A results as follows:

$$A = \begin{pmatrix} \dfrac{k_x \cdot 1_x^2 \cdot \Phi_y}{1_z \cdot v_z} - \dfrac{k_x(1_z^2 \cdot v_z \cdot \Phi_x + 1_x^2 \cdot 1_z^2 \cdot \Phi_x \cdot \Phi_y)}{1_z^3 \cdot v_z \cdot \Phi_x} & 0 & 0 \\ 0 & \dfrac{k_y \cdot 1_y^2 \cdot \Phi_x}{1_z \cdot v_z} - \dfrac{k_y(1_z^2 \cdot v_z \cdot \Phi_y + 1_y^2 \cdot 1_z^2 \cdot \Phi_x \cdot \Phi_y)}{1_z^3 \cdot v_z \cdot \Phi_y} & 0 \\ \dfrac{k_z \cdot 1_x}{1_z} & \dfrac{k_z \cdot 1_y}{1_z} & k_z \end{pmatrix}$$

The specific coordinates of a measuring point, as a rule, are determined only up to the center point of the probe ball 14. For this reason, for determining a point actually touched on the workpiece surface, the radius $r_t$ or the diameter $d_t$ of the probe ball 14 is additionally required as explained above.

The 13 unknown parameters, which are listed by way of example for the probe head 5, namely, the three components of the offset vector $p_0$, nine components of the matrix A as well as the probe ball diameter $d_t$, were in the past all determined as follows.

In a first step, the calibration sphere 15 is touched at a plurality of measuring points i=1 . . . n. The parameters of the offset vector $P_0$, the matrix A and the probe ball diameter $d_t$ are determined by means of suitable calibration algorithms from the respectively determined measuring coordinates $P_{Gi} = \{X_{Gi}, Y_{Gi}, Z_{Gi}\}$ and the corresponding signal vectors $si = \{u,v,w\}$ measured by the probe head 5. The signal vectors $si = \{u,v,w\}$ are measured from the probe head 5. In a later measuring sequence, as described above, with the aid of the normal unit vector n, the precise measuring point J is determined from this probe ball diameter $d_t$, that is, the probe ball radius $r_t$ determined therefrom.

In the measurement, the probe ball 14 contacts the workpiece 7 to be measured principally in the normal direction or, in the case of a calibration, the probe ball 14 contacts the calibration sphere 15. For this reason, the calibration is usually carried out as a best fit routine according to Gauss with the objective of minimizing the sum of least squares of the normal deviations $f_{ni}^2$ to the calibration sphere in correspondence to the following target function:

$$Q_1 = \sum f_{n,i}^2 \Rightarrow \text{Min} \tag{3}$$

As shown in FIG. 4, all measuring points $p_i$ (with i=1 . . . n wherein n>13) for a calibrated probe head lie on a ball having the radius $r_{Ges} = r_k + r_t$ wherein $r_K$ is the radius of the calibration ball 15 and $r_t$ is the radius of the probe ball 14. The position vector $p_K$ of the ball center point of the calibration ball 15 was, for example, measured at an earlier time point. With the position vector $p_K$, there results for an error $f_{n,i}$, which is to be inserted in equation (3), the following:

$$f_{n,i} = |p_i - p_k| - (r_k + r_t) \tag{4}$$

$$= |p_{Gi} + p_0 + As_i - p_k| - (r_k + r_t)$$

Index i defines a running index and the i-th measurement point is identified by i=1 . . . n.

It is, however, shown that the resolution of the corresponding normal equation system is not possible with the conventional solution method because the matrix of the normal equation system is singular. Robust square averaging methods, for example, that of Householder, also supply only a solution in exceptional cases. The reason for this singularity is that three coefficients are contained in the probe matrix A which are responsible only for the probe pin deflection tangentially to the surface of the calibration ball 15 at the contact point. These tangential components are, however, not detected by the target function in accordance with equation (3) or are only detected small by the second order so that the normal equation system from equation (3) is in principle undetermined. In the case of conventional probe heads having three linear guideways arranged at right angles (for example, parallel spring guides) having substantially matching stiffness and linear sensors, this singularity did not occur in the past.

In accordance with the invention, the probe matrix A is therefore so changed that at least a portion of the parameters specifically describe components of the probe pin deflection which are tangential to the surface of the workpiece at the contact point. For this purpose, the probe matrix is subdivided into two components as follows:

$$A_{sym} = 0.5(A + A^T) \tag{5}$$

$$A_{anti} = 0.5(A - A^T) \tag{6}$$

$A^T$ is here the transposed matrix of A. In this way, the following matrices result:

$$A_{sym} = \begin{pmatrix} a_{11} & a_{12} & a_{13} \\ a_{12} & a_{22} & a_{23} \\ a_{13} & a_{23} & a_{33} \end{pmatrix} \quad A_{anti} = \begin{pmatrix} 0 & b_{12} & b_{13} \\ -b_{12} & 0 & b_{23} \\ -b_{13} & -b_{23} & 0 \end{pmatrix} \tag{7}$$

which are to be determined in accordance with different target functions. The following relationship is present between the two matrices $A_{sym}$ and $A_{anti}$ and the probe matrix A:

$$A = A_{sym} + A_{anti} \tag{8}$$

These two components of the probe matrix are:
the symmetrical probe matrix $A_{sym}$ which, in coaction with the elastic characteristics of the probe, describes the component of the probe deflection which is normal to the surface of the workpiece at the contact point J; and,
the antisymmetrical probe matrix $A_{anti}$ which as a rotational matrix effects components of the probe deflection, which are tangential to the surface of the workpiece at the touch point J.

With the target function of equation (3), only the coefficients of the matrix $A_{sym}$ are clearly determined. The antisymmetrical matrix $A_{anti}$ effects only tangential components of the deflection. For this reason, for the determination of the antisymmetrical matrix, a further target function must be introduced. In the case of probe heads having three orthogonal linear guides with substantially matching stiffness and linear sensors, the antisymmetrical coefficients {$b_{12}$, $b_{13}$, $b_{23}$} are negligibly small. Only in this special case could the calibration of a probe head be reliably resolved on the basis of the usual Gaussian target function $Q_1$.

A target function for the second matrix $A_{anti}$ cannot be derived directly from the measured values because the tangential displacements of the probe ball 14 on the calibration ball 15 are neither precisely known as to magnitude nor as to direction and are further, because of the friction, anyway undetermined. Accordingly, other conditions must be introduced which include the elastic as well as all other characteristics of the probe ball 5 (transfer coefficients and arrangement of the signal converters) when touch contacting the calibration ball 15.

The basis for the derivation of the target function for the tangential deviations is seen in that, in the ideal case, at the contact point J, the measurement force vector $F_M$ adjusts in the normal direction to the measurement surface and therefore is known with respect to its direction.

Figure 5:
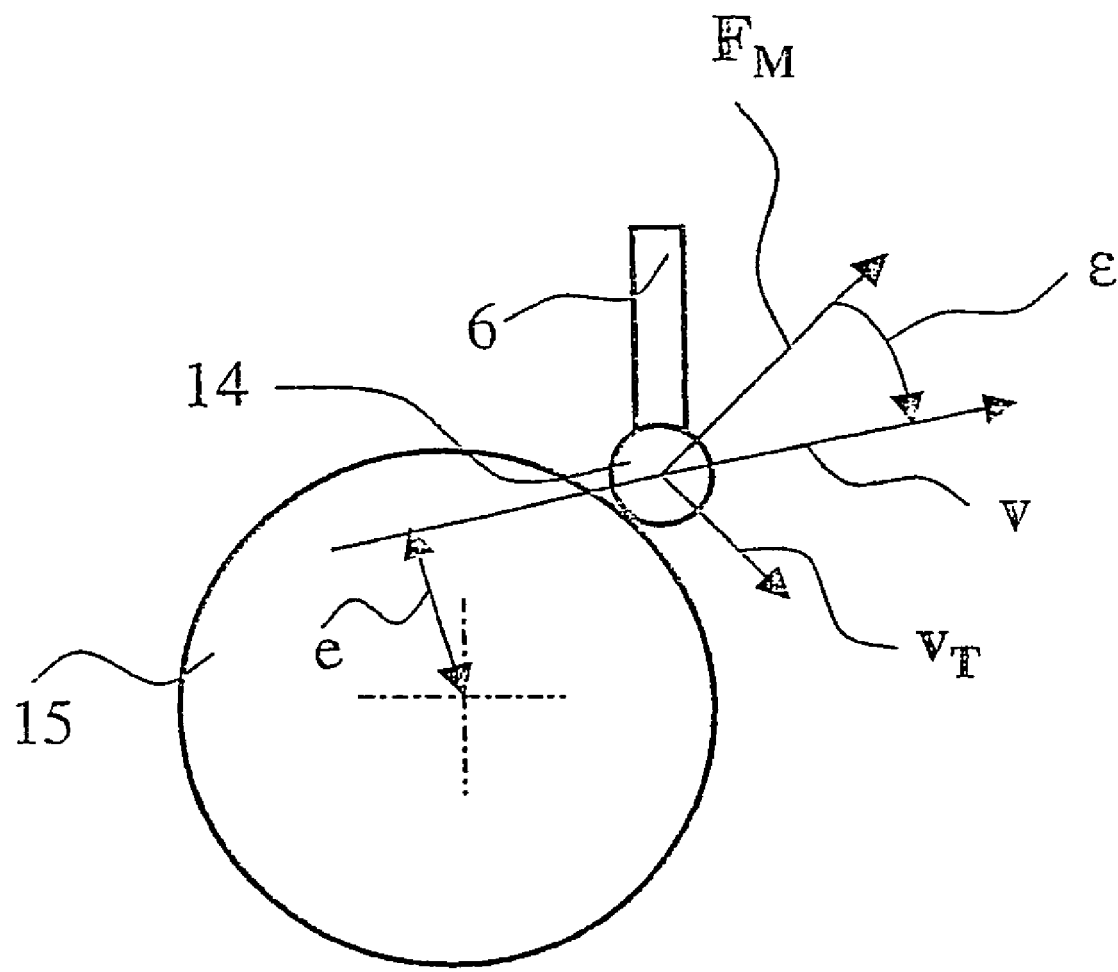

Of course, this applies only approximately because the measuring force $F_M$, as described above, is not exactly normal to the workpiece surface at the contact point J; instead, the measuring force is somewhere within the friction cone k. The deflection vector $v=\{v_x, v_y, v_z\}$ and the force vector $F_M$ conjointly define, in general, an angle ($\epsilon$) as shown in FIG. 5. The angle ($\epsilon$) can assume values which are significantly greater than the friction cone k and can be almost 90° so that perforce a tangential component $v_t$ of the deflection vector v arises which, in the general case, is always unequal to zero.

This tangential component $v_t$ lies in the tangential plane and can be computed as vector product $v_t = v \times n$ from deflection vector v and normal vector n. The vector product $v_t$ can be interpreted also as a moment vector of the vector v with the lever arm (e). For a linear elastic system, the situation applies that this vector $v_t$ results exactly in the zero vector when averaging over all points of the contact touchable half of the calibration ball:

$$\int_{hemisphere} v_t \, dA = (0\ 0\ 0)^T \quad (9)$$

In the case of antisymmetrical additional elements in the matrix A, on average, the following expression remains:

$$\int_{hemisphere} v_t \, dA = \frac{4\pi}{3}(-b_{23}\ b_{13}\ -b_{12})^T \quad (10)$$

The equation (9) approximately applies even when the calibrating ball is contacted with the same force at points distributed adequately and uniformly over the hemisphere:

$$\Sigma(v \times n) \approx 0 \quad (11)$$

From this condition, a second target function for the determination of the three coefficients $\{b_{12}, b_{13}, b_{23}\}$ of the antisymmetrical matrix can be derived as follows:

Measurement Condition: for the calibration, an adequate number of points evenly distributed over the hemisphere on the calibrating ball is to be measured;

Equalization Condition and Target Function: the sum of the moments of the deflection vectors about the three axes of the calibration ball must be zero or, approximately, the sum of the squares of the moments about the three axes must result in a minimum.

From the above, the two target functions $Q_2$ and $Q_3$ follow for the sought after coefficients:

$$Q_2 = \Sigma v_i \times n_i \to 0 \quad (12)$$

$$Q_3 = \Sigma(v_i \times n_i)^2 \to \text{Min} \quad (13)$$

wherein:

$v_i$ is the i-th deflection vector of the probe ball 14; and, $n_i$ is the i-th normal vector for the calibration ball 15 through the i-th measurement point.

The above explanations make clear that both target functions can supply only approximate solutions for the coefficients $\{b_{12}, b_{13}, b_{23}\}$ and that they supply a complete solution only in the boundary case with very many uniformly distributed measuring points. The decision between the two possible target functions ($Q_2$ is the correct start) as well as the number and arrangement of the measuring points on the calibration ball 15 are to be derived from experimental results.

For the numerical realization of the probe calibration, the probe parameters are to be improved iteratively in accordance with the two target functions $Q_1$ and $Q_2$ or $Q_3$ in an optimization computation until the improvements of the matrix coefficients are sufficiently small. Results are then the nine coefficients of the probe matrix A, the probe ball diameter $d_t$ as well as the position $p_0$ of the probe offset.

It is understood that the foregoing description is that of the preferred embodiments of the invention and that various changes and modifications may be made thereto without departing from the spirit and scope of the invention as defined in the appended claims.

What is claimed is:

1. A method for measuring measurement values on a workpiece with a coordinate measuring apparatus including a measuring probe head having a deflectable probe pin, the method comprising the steps of:

obtaining deflection signals (s) from said measuring probe head;

providing parameters (A) of which at least a portion ($A_{anti}$) thereof describes components of the probe pin deflection which are tangential to the surface of the workpiece at a touch point; and, causing said coordinate measuring apparatus to carry out a translation of said deflection signals (s) into a coordinate system ($X_M$, $Y_M$, $Z_M$) of said coordinate measuring apparatus utilizing said portion ($A_{anti}$) of said parameters (A).

2. The method of claim 1, wherein said portion ($A_{anti}$) of said parameters (A) forms a matrix.

3. The method of claim 2, wherein said matrix is a rotational matrix.

4. The method of claim 1, wherein additional parameters ($A_{sym}$) are used to form said deflection signals (s) which describe components of the probe pin deflection which are normal to the surface of said workpiece at said touch point.

5. The method of claim 4, wherein said additional parameters ($A_{sym}$) form a matrix and are determined from the following target function with a Gaussian equalization condition:

target function $$Q_1 = \sum f_{n,i}^2 \Rightarrow \text{Min}$$

wherein $f_{n,i}$ are the normal deviations, that is, the deviations in the normal direction, which is normal to the surface of the workpiece, at the touch point.

6. A method for measuring measurement values on a workpiece with a coordinate measuring apparatus including a measuring probe head having a deflectable probe pin, the method comprising the steps of:

obtaining deflection signals (s) from said measuring probe head;

providing parameters (A) of which at least a portion ($A_{anti}$) thereof describes components of the probe pin deflection which are tangential to the surface of the workpiece at a touch point;

causing said coordinate measuring apparatus to carry out a translation of said deflection signals (s) into a coordinate system ($X_M$, $Y_M$, $Z_M$) of said coordinate measuring apparatus utilizing said parameters (A);

wherein said portion ($A_{anti}$) of said parameters (A) forms a matrix; and, wherein said probe pin includes a probe ball; and, for determining said portion ($A_{anti}$), at least one of the following two target functions is satisfied:

target function $Q_2 = \Sigma v_i \times n_i \to 0$; or, target function $Q_3 = \Sigma (v_i \times n_i)^2 \to$ Min wherein $v_i$ = deflection vector of the probe ball at the measurement point; and, $n_i$ = normal vector at said touch point of said probe ball when measuring.

7. The method of claim 6, wherein measurement points are used to solve at least one of said target functions ($Q_2$ and/or $Q_3$); and, said measuring points are recorded by touch contacting at least one semicircle on a calibration body.

8. The method of claim 7, wherein the touch contacted measuring points are so recorded that they are uniformly distributed over the touch-contacted semicircle or over the touch-contacted hemisphere.

9. The method of claim 7, wherein said calibration body is a calibration ring or a calibration sphere.

10. A coordinate measuring apparatus comprising:

a probe head having a probe pin moveably attached thereto;

a control and evaluation unit having parameters (A) stored therein;

a portion ($A_{anti}$) of said parameters (A) defining components of the probe pin deflection which are tangential to the surface of the workpiece at a touch point; and, said control and evaluation unit functioning to compute a translation of output signals (s) into a coordinate system ($X_M$, $Y_M$, $Z_M$) of said coordinate measuring apparatus utilizing said portion ($A_{anti}$) of said parameters (A).

11. The coordinate measuring apparatus of claim 10, wherein said portion ($A_{anti}$) of said parameters (A) forms a matrix.

12. The coordinate measuring apparatus of claim 11, wherein said matrix is a rotational matrix.

13. The coordinate measuring apparatus of claim 10, wherein additional parameters are used to form said deflection signals (s) which describe components of the probe pin deflection which are normal to the surface of said workpiece at said touch point.

14. The coordinate measuring apparatus of claim 13, wherein said additional parameters ($A_{sym}$) form a matrix.

15. The coordinate measuring apparatus of claim 13, wherein said additional parameters ($A_{sym}$) form a matrix and are determined from the following target function with a Gaussian equalization condition:

target function $$Q_1 = \sum f_{n,i}^2 \Rightarrow \text{Min}$$

wherein $f_{n,i}$ are the normal deviations, that is, the deviations in the normal direction, which is normal to the surface of the workpiece, at the touch point.

16. A coordinate measuring apparatus comprising:

a probe head having a probe pin moveably attached thereto;

a control and evaluation unit having parameters (A) stored therein;

said control and evaluation unit functioning to compute a translation of output signals (s) into a coordinate system ($X_M$, $Y_M$, $Z_M$) of said coordinate measuring apparatus;

a portion ($A_{anti}$) of said parameters (A) defining components of the probe pin deflection which are tangential to the surface of the workpiece at a touch point;

wherein said portion ($A_{anti}$) of said parameters (A) forms a matrix; and, wherein said probe pin includes a probe ball; and, for determining said portion ($A_{anti}$), said control and evaluation unit can satisfy at least one of the following two target functions:

target function $Q_2 = \Sigma v_i \times n_i \to 0$; or, target function $Q_3 = \Sigma (v_i \times n_i)^2 \to$ Min wherein $v_i$ = deflection vector of the probe ball at the measurement point; and, $n_i$ = normal vector at said touch point of said probe ball when measuring.

17. The coordinate measuring apparatus of claim 16, wherein said control and evaluation unit so controls said coordinate measuring apparatus for recording measurement values that the measurement points, which are needed to solve at least one of said target functions ($Q_2$ and/or $Q_3$), are recorded by touch contacting at least one semicircle on a calibration body.

18. The coordinate measuring apparatus of claim 17, wherein said control and evaluation unit so controls said coordinate measuring apparatus for recording measurement values that said measurement values are uniformly distributed over the touch-contacted semicircle or hemisphere.

19. The coordinate measuring apparatus of claim 17, wherein said calibration body is a learning ring or a calibration sphere.

20. A computer program product which can be downloaded into the internal memory of a digital control and evaluation unit of a coordinate measuring apparatus, the coordinate measuring apparatus including a measuring probe head having a deflectable probe pin, said computer program product comprising: software code sections functioning to carry out a linear translation of measurement values (s) of said probe head into a coordinate system ($X_M$, $Y_M$, $Z_M$) of said coordinate measuring apparatus while utilizing parameters (A) of which at least a portion ($A_{anti}$) thereof describes components of the probe pin deflection which are tangential to the surface of a workpiece in the touch point.

21. A machine readable data carrier comprising: a computer program product; the computer program product being downloaded into the internal memory of a digital control and evaluation unit of a coordinate measuring apparatus; the coordinate measuring apparatus including a measuring probe head having a deflectable probe pin; and, said computer program product including software code sections functioning to carry out a linear translation of measurement values (s) of said probe head into a coordinate system ($X_M$, $Y_M$, $Z_M$) of said coordinate measuring apparatus while utilizing parameters (A) of which at least a portion ($A_{anti}$) thereof describes components of the probe pin deflection which are tangential to the surface of a workpiece in the touch point.

* * * * *